March 13, 1951    H. JENSEN    2,544,686
IMAGE STABILIZING APPARATUS FOR TWIN LENS CAMERAS
Filed July 1, 1946    4 Sheets-Sheet 1

Inventor
*H. Jensen*
By *M. O. Hayes*
Attorney

March 13, 1951        H. JENSEN        2,544,686
IMAGE STABILIZING APPARATUS FOR TWIN LENS CAMERAS
Filed July 1, 1946        4 Sheets-Sheet 2

Inventor
H. Jensen
By M. O. Hayes
Attorney

March 13, 1951 H. JENSEN 2,544,686
IMAGE STABILIZING APPARATUS FOR TWIN LENS CAMERAS
Filed July 1, 1946 4 Sheets-Sheet 3

Inventor
H. Jensen
By M. Hayes
Attorney

March 13, 1951     H. JENSEN     2,544,686
IMAGE STABILIZING APPARATUS FOR TWIN LENS CAMERAS
Filed July 1, 1946     4 Sheets-Sheet 4

H. Jensen, Inventor

By M. O. Hayes, Attorney

Patented Mar. 13, 1951

2,544,686

UNITED STATES PATENT OFFICE 2,544,686

IMAGE STABILIZING APPARATUS FOR TWIN LENS CAMERAS

Homer Jensen, Philadelphia, Pa.

Application July 1, 1946, Serial No. 680,786

11 Claims. (Cl. 95—12.5)

(Granted under the act of March 3, 1883, as amended April 30, 1928; 370 O. G. 757)

This application is a continuation-in-part of my application for Image Stabilizing Apparatus and Method, filed April 15, 1946, Serial No. 622,164.

This invention relates to image stabilizing apparatus for airplane photography, and the maintenance of a vertical line of sight between the camera and the earth, or a true line of sight between the camera and any other chosen direction which it is desired to maintain. More specifically, it contemplates an improved stabilizing system employing a pair of optical devices for each camera lens, each device being stabilized to compensate for angular movement of the aircraft in a different plane or direction.

Whereas the device is especially well adapted for use on aircraft, it is, of course, suitable for use on any other moving body on which the camera would be subjected to random angular movements with respect to the object which it is desired to photograph.

In normal flight, an aircraft usually suffers many disturbing influences which prevent flight in a substantially straight line. These random movements are generally called crabbing, yawing, pitching or rolling, depending upon the particular angular motion involved. They all, if not compensated for, result in undesirable effects upon the result of photographs of the ground taken from the aircraft, resulting in distortion. The subject invention provides highly novel and improved means for compensating for these random movements of the aircraft, particularly the roll and pitch.

As fully explained in the foregoing prior copending application, prior art devices attempting to accomplish the aims of the subject invention have been unsatisfactory, for a variety of reasons. In the subject invention, by employing two separate optical devices or reflectors for each lens, placed so as to cause minimum angles of reflection and individually stabilized by two stabilizing devices, to compensate for pitch and roll of the aircraft, rotation and distortion of the image are avoided.

Any suitable stabilizing means may be employed, consisting essentially of a reference element or elements adapted to resist angular movements of the moving body occurring in a predetermined plane, or, in other words, to maintain its orientation to the ground or object as the body moves with respect thereto. Associated with this reference element is a moving system composed of one or more elements, adapted to move in a predetermined manner with respect to the reference element as the body moves angularly in a certain plane with respect to the ground or object. These requirements for the stabilizing devices are met by gyroscopes. By using separate gyroscopes individual to the reflectors, it is possible to employ very simple operative control connections between the reflectors and the gyroscopes, permitting improvements in the precision of compensation, as well as increasing the rapidity of compensation.

Recent improvements in cameras are taken advantage of in the present invention. For example, cameras are now available which have extremely narrow slits or angles of acceptance, and the subject invention was designed to take advantage of this, as will be subsequently apparent.

A preferred embodiment of the device, employing two mirrors, is especially adapted for use with cameras of the "continuous-strip" type, where the angle of divergence of the lines which define the field of view in one plane transverse to the focal slit of the camera, is very small. In this embodiment, the two mirrors can be placed so as to cause the various portions of the light path to have minimum angles of deviation from each other, and hence to reduce image rotation to a minimum.

The subject apparatus may be employed advantageously with cameras having more than one lens, as will be hereafter described, for example, a stereo-camera.

One of the objects of the present invention is to provide new and improved means for stabilizing the field of view of a camera adapted to be mounted on a moving body.

Another object is to provide new and improved means for mounting a plurality of movable reflectors in predetermined spaced relation to a camera lens.

Another object is to provide a stabilized optical system for use with a stereo-camera.

Still another object is to provide a method of image stabilization.

A further object is to provide an image stabilized stereo-camera.

Other objects and advantages not specifically set forth hereinabove will be apparent after consideration of the following description of the apparatus, taken in conjunction with the accompanying drawings, in which.

Figure 1:
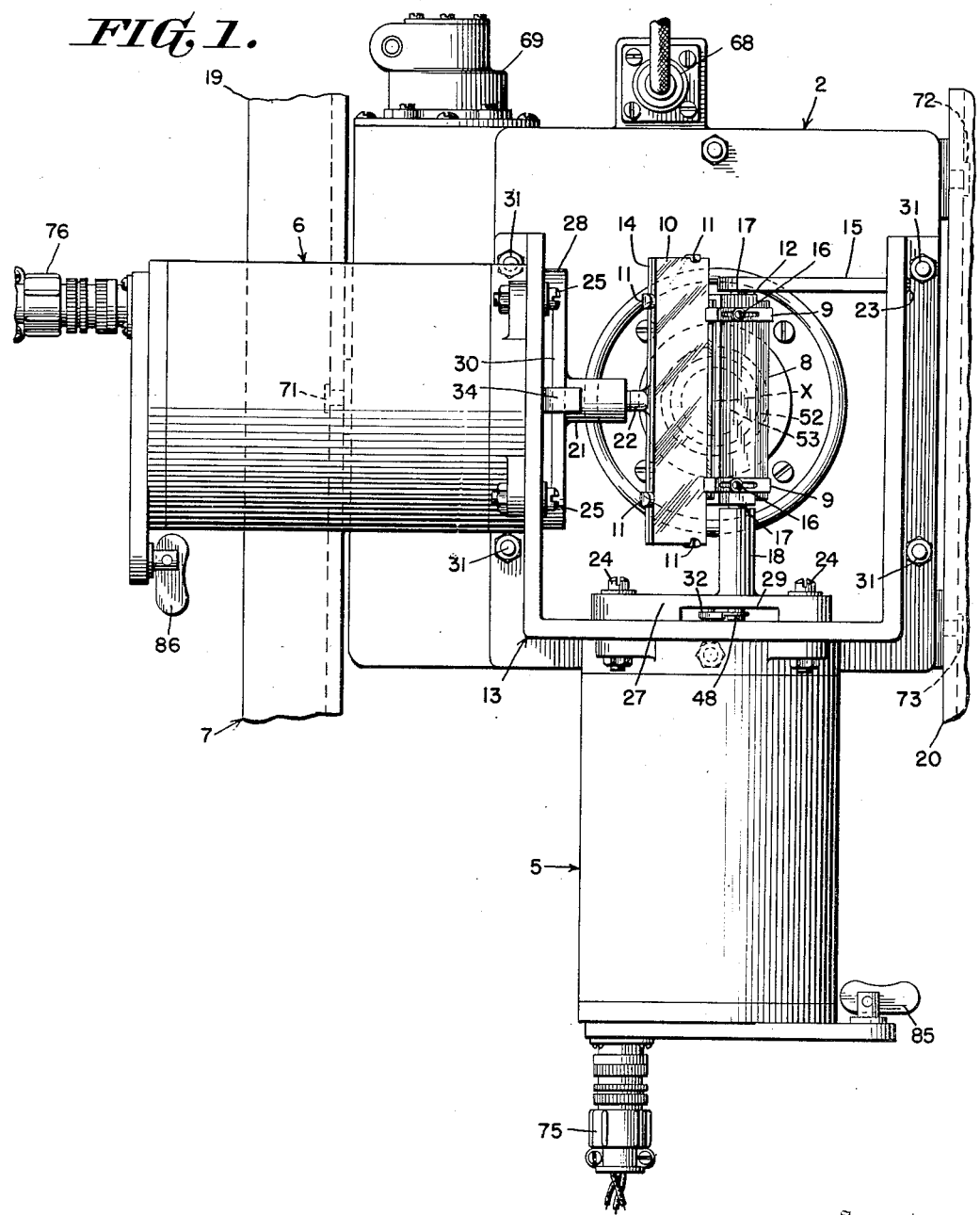
Fig. 1 is a bottom plan view of an image stabilizing optical system applied to a camera having a single lens.

Referring now to the drawings in which like numerals are used throughout to designate like parts, and more particularly to Fig. 1, there is revealed, in bottom plan view, a camera 2 having two mirrors 8 and 10 mounted in predetermined spaced relation to the lens 53, each of the mirrors being adapted to be rotated about an axis by action of gyroscopes 5 and 6 respectively to compensate for angular movements of the camera in two planes with respect to the object which it is desired to photograph. It is understood that the camera may be mounted in an aircraft by any suitable supporting structure, the lens axis coinciding with the plumb-line, when it is desired to photograph the terrain directly beneath the aircraft.

Any suitable camera may be used, for example a continuous-strip camera known in the trade as a Sonne S-7, manufactured by the Chicago Aerial Survey Company. This camera is characterized by having a very narrow slit or optical opening, resulting in an angle of acceptance which is extremely narrow, which offers many aforementioned advantages, as will be hereafter elaborated.

In Fig. 1, three studs 71, 72, and 73 are provided for supporting the camera 2 on cross bars 19 and 20 of the aforementioned main supporting structure. A power connection 68 is provided for bringing power to the motor of the camera, the motor providing for movement of the film. Speed control means of any convenient design may be provided within the camera to permit adjusting the speed of the film into correspondence with the speed of the aircraft, a speed control connection being provided at 69.

The gyroscopes 5 and 6 shown in block outline mounted on the framework 13 have power connections 75 and 76 respectively, and caging lever controls 85 and 86 respectively. Any suitable driving means may be employed for the gyroscopes. As will be hereafter explained more fully, whereas any suitable arrangement may be provided, in the subject embodiment each gyroscope has an outer gimbal ring adapted to be maintained in a predetermined position, with a shaft attached thereto which rotates about its axis as the gyroscope operates to perform its usual stabilizing function, the gimbal rings and shafts not being shown in Fig. 1.

The aforementioned frame 13 of aluminum or other suitable material is adapted to be attached to the camera 2 as by screws 31 having nuts associated therewith and the frame having disposed within the two aforementioned optical mirrors 8 and 10, mounted upon supports 12 and 14 respectively, and held in place thereon by clamps 9 and 11 respectively, which are secured to the supports by screws, such as 16. The support 12 may be integral with two end shafts 17, one of which is journalled for rotation in the supporting stanchion 15 and one in the supporting post 18, the latter shaft extending through the post 18 to a lever arm 32 fixed thereto by screw 48, to form an operative connection, not visible in Fig. 1, to the aforementioned gyroscope 5, fixed to the frame 13 by any suitable means. The post 18 may be formed integral with a cross support 27 having cut away central portion 29, and which is attached to frame 13 by suitable means, such as screws 24. The gyroscope may be of any suitable make which has properties heretofore described. The stanchion 15 is secured, as by screws 23, to the supporting frame 13. In the operation of the device to stabilize an image as the aircraft moves, the mirror 8 rotates about the axis of shaft 17, as will be more fully explained subsequently.

Somewhat beneath (as viewed in Fig. 1) and partly to one side of mirror 8 is the aforementioned similar mirror 10, the support for which, designated at 14, is adapted to rotate with a shaft 22 journalled for rotation in support 21, and which extends therethrough to permit an operative connection with the second aforementioned gyroscope 6, said connection including a lever arm, not visible in Fig. 1, fixed to shaft 22 to rotate therewith, and having an extended counterbalance observed at 34. The post 21 may be formed integral with a cross support 28 having cut away central portion 30 for movement of the aforementioned lever, and which may be attached to the frame 13 by any suitable means, such as screws. The gyroscope 6 may be attached to the frame 13 by any suitable means, such as by screws 25.

Disposed beneath the mirrors (as viewed in Fig. 1) is the lens barrel 52 and lens 53, the lens axis being designated at X. Whereas the lens axis is shown in Fig. 1 as being normal to the axis of rotation of the mirror 10 and in the same plane, the exact position of the lens axis with respect to the axes of rotation of mirrors 8 and 10 is not critical, it being permissible to shift the lens axis over a considerable area with respect to the mirrors and still maintain proper optical operation of the device.

The two mirrors 8 and 10 in their normal positions, that is, when no compensating adjustment is taking place, have their faces inclined at equal small angles as required by the design of the particular embodiment, and in this case 10 degrees, with respect to a plane normal to the line of sight or lens axis. This inclined relationship permits light reaching the mirror 10 from the desired image or object, if travelling in a direction parallel to the line of sight of the lens of camera 2, after reflection at an angle of 20 degrees (or twice the angle of incidence) by both mirrors 10 and 8, to reach the camera lens 53 in the proper manner, in a path parallel to the lens axis.

Operative connections between the two mirror shafts 17 and 22 of mirrors 8 and 10 respectively, and gyroscopes 5 and 6 respectively, include lever arms fixed to the shafts to turn therewith, one of the lever arms being shown at 32 in Fig. 1. The lever arms each have a longitudinally extending slot disposed therein to receive a pin, the pins being fixed to respective crank arms which are secured to the gimbal shafts of the respective gyroscopes. As the gimbal rings of the gyroscopes turn, the movement is imparted to the gimbal shafts, and through the linkage of the cranks and levers to the mirror shafts.

As stated previously, the gyroscopes 5 and 6 may be of any suitable design, for example, vertical seeking gyroscopes having adjustable precessing mechanisms, provided that the desired movements of the aforementioned pins which control the degree of rotation of mirrors 8 and 10 respectively, are accomplished. The desired amount of movement is governed by the basic law for reflection from plane mirrors, that is, that the angle of reflection is equal to the angle of incidence. The angle between the light rays reaching the mirrors and those leaving the mirror after reflection will then be twice the angle of incidence.

The required corrective movement, or angular movement of the mirrors about their supporting shafts, will then be one-half the angular movement of the camera with respect to the desired object, that is, the angular movement in a plane perpendicular to the axis of rotation of the respective mirror.

The required corrective movement of the mirrors may be secured by proper proportioning the lengths of the gimbal shaft cranks and the lever arms attached to the mirror shafts. For both mirror shafts, the distance between the axis of the gimbal shaft and the center line of the pin attached to the crank should be one-half the distance between the pin center line and the axis of rotation of the mirror shaft.

Assuming that the line of flight of the aircraft is from left to right in Fig. 1, mirror 10 will correct for roll, mirror 8 for pitch. To accomplish image stabilization, it is necessary that the mirror 10 be rotated in the opposite direction from the angular movement of the aircraft as it rolls, whereas mirror 8 must be rotated in the same angular direction of the aircraft as it pitches.

The desired directions of angular movement of the mirrors may be secured by proper arrangement of the operative connections to the gyroscopes. The gyroscope, in resisting angular movement of the supporting body, tends to maintain the gimbal ring in the same position with respect to the earth, and the crank arm attached to the gimbal shaft always moves angularly with respect to the aircraft in an opposite direction to that in which the aircraft moves angularly with respect to the earth. The desired movements of the mirrors, then, are accomplished by providing a connection between shaft 22 so that the shaft and mirror 10 rotate in the same angular direction as the crank attached to the gimbal shaft of gyroscope 6, whereas the connection between shaft 17 of mirror 8 and the crank arm attached to the outer gimbal ring of gyroscope 5 should rotate the shaft in the opposite direction from the movement of the gimbal ring. In the subject embodiment, connections are provided wherein the crank arm operated by gyroscope 5 extends toward the mirror shaft, whereas the crank arm operated by gyroscope 6 extends in a direction away from the mirror shaft, the aforementioned 2 to 1 relationships being maintained. This arrangement provides for the proper operation of the mirrors to provide compensating movements to correct for pitch and roll of the aircraft.

Figure 2:
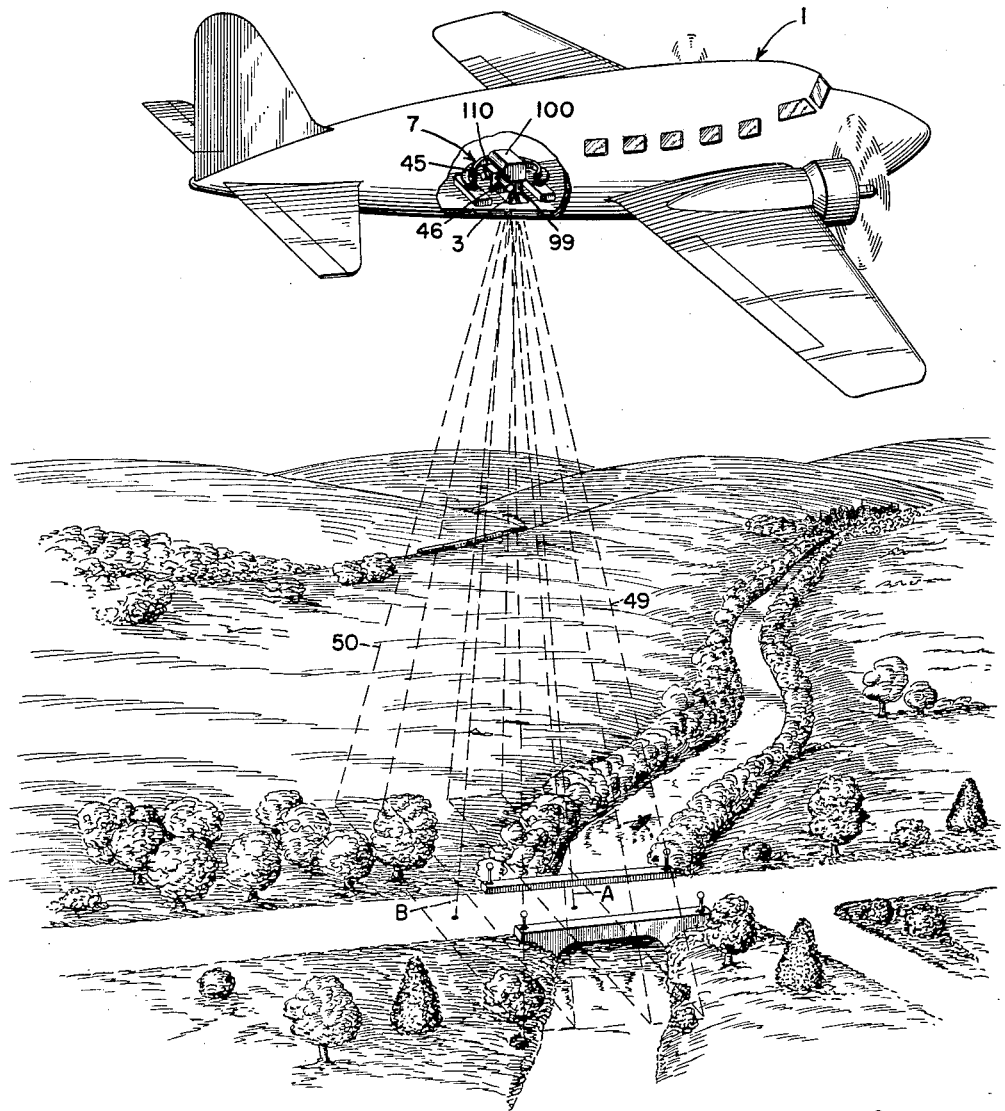
Fig. 2 is a general view of the device showing a stereo-camera mounted in an aircraft, and the fields of view of the two lenses of the camera with respect to the terrain beneath.

Referring now to Fig. 2, there is revealed an embodiment of the invention employing a stereo-camera 100 having a pair of lenses, mounted within an aircraft 1 upon a supporting framework generally designated at 7. The aircraft is seen to have an opening 3 in the bottom thereof to provide unobstructed fields of view for the lenses, the fields of view being designated at 49 and 50, it being observed that one of the fields of view is directed somewhat in advance of the other. It is understood that in actuality the fields of views are disposed only a very small amount from each other in a direction normal to the line of flight. Gyroscopes 45 and 46 are provided for reasons to be more fully explained hereafter, it being observed that the gyroscopes have caging levers 93 and 94 and power connections 95 and 96 respectively, and that the gyroscopes have feet 91 and 92 respectively bored to receive screws 89 and 90 respectively for securely fastening the gyroscopes to the supporting framework.

Figure 3:
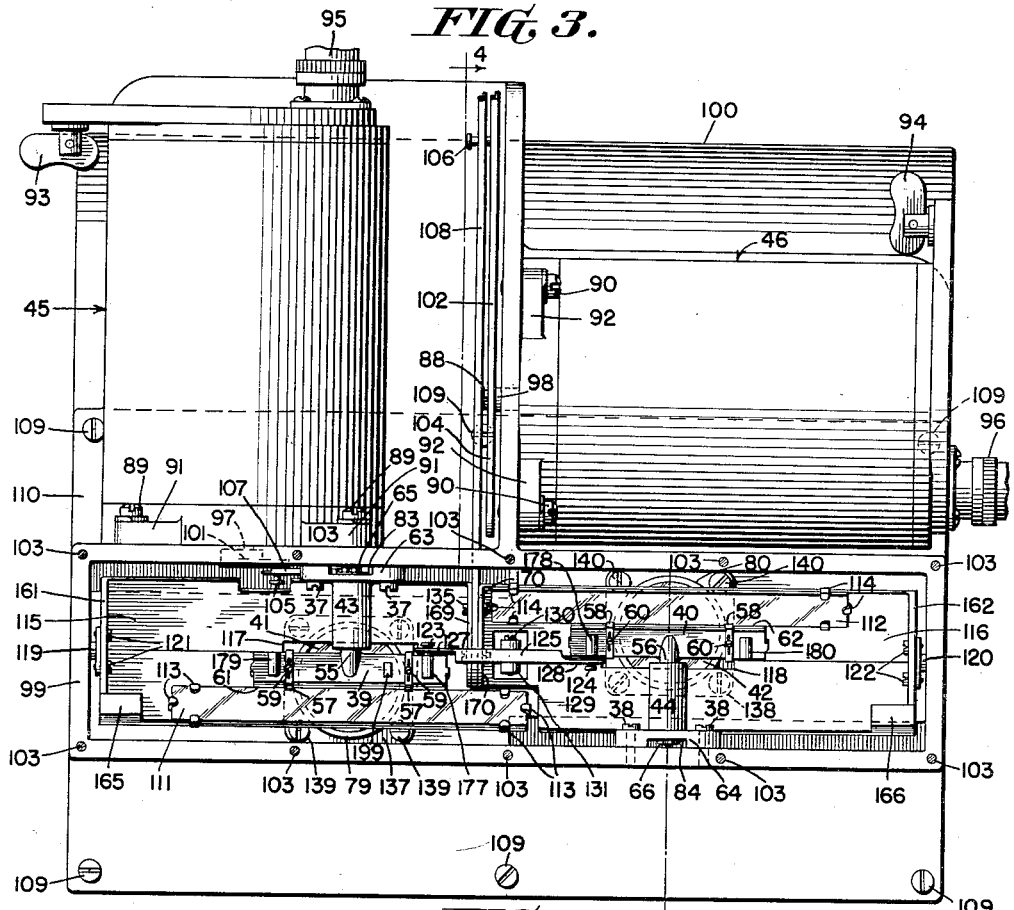
Fig. 3 is an enlarged general bottom plan view of the camera of Fig. 2 showing the mirrors, mirror supporting structure, and gyroscopes.

Reference is made now to Fig. 3 which shows an enlarged bottom plan view of the stereo-camera 100 of Fig. 2. The camera may be a continuous-strip stereo-camera having suitable means for synchronizing the speed of the film with the speed of the aircraft. Fig. 2 shows the camera mounted in the aircraft, so that, as seen in Fig. 3, the line of flight is from top to bottom. The two lenses 41 and 42 having lens barrels 79 and 80 respectively are seen to be displaced a small amount from the camera axis normal to the line of flight, the lens 41 being disposed somewhat in advance of the camera axis, the lens 42 being disposed an equal amount to the rear. As will be subsequently more fully explained, the field of view 49 of lens 41 is directed slightly in advance of the plumb line of the aircraft, and the field of view 50 of lens 42 is directed slightly toward the rear, the two fields being represented by the pyramids in dashed lines in Fig. 2.

Any suitable stereo-camera may be used, for example, a continuous-strip camera in which the continuous images from lenses 41 and 42 are recorded in adjacent positions on the film, the instantaneous image of lens 41 being in a slightly advanced position on the film from the image recorded by lens 42 at the same instant, it being assumed that the direction of travel of the film is the same as the direction in which the aircraft flies.

Positioned around the lenses, as shown, is a rectangular housing 99, which may be formed integral with a plate 110 adapted to be removably secured as by screws 109 to the main body of the camera 100. Within the housing 99, and extending longitudinally from the ends thereof are two angularly bent supporting plates or frames 115 and 116, whose shape is more clearly revealed in Fig. 4. At the outer ends of the frames are raised end portions 161 and 162 respectively, which have secured thereto, as by screws 121 and 122 respectively, extended shafts or studs 119 and 120 having flange portions bored to receive the screws and which serve as bearings for the frames, shafts 119 and 120 being journalled for rotation in suitable bores in the end walls of housing 99, ball bearings 167 and 168, Fig. 5, being provided therefor to insure frictionless rotation. At the inner ends of supports 115 and 116 are also raised edged 169 and 170 respectively, these being fixed, as by screws 135 having nuts thereon, to an arm 108 extending through an opening 172 in the side wall of housing 99, to form an operative control connection with a gyroscope 46, as will be more fully explained subsequently, movement of the shaft 108 resulting in rotation of the supports 115 and 116 about the axes of their shafts 119 and 120 respectively.

The supports 115 and 116 have openings or cut-away portions 117 and 118 therein respectively to provide for passage of light rays to the lenses 41 and 42 respectively.

Fixed to each of the supports 115 and 116 are mirrors 111 and 112 respectively disposed as shown in Fig. 3 with their faces up, secured to the supports by clamps 113 and 114 respectively, the clamps being secured to the supports in any convenient manner, as by welding.

Disposed adjacent and above (as viewed in Fig. 3) the mirrors 111 and 112 are mirrors 61 and 62 respectively mounted upon supports 39 and 40 respectively and held securely thereto by clamps 57 and 58 respectively, which may be fixed to the supports as by screws 59 and 60 respectively. The supports 39 and 40 may be formed integral with a pair of shafts 55 and 56 respectively, which are journalled for rotation in posts 43 and 44 respectively, ball bearings being provided therein, one set being shown at 152, Fig. 4. The shaft 56 has the outer end thereof threaded to receive a retaining nut 66. The shaft 55 extends through the post 43, the end thereof being threaded, and having fixed thereon a lever arm 107 held in place by nut 65, the lever arm being operatively connected to gyroscope 45 in a manner to be subsequently more fully explained.

The posts 43 and 44 may be formed integral with cross supports 63 and 64 respectively, fixed to the housing 99 by screws 37 and 38 respectively, and having cut away portions 83 and 84 respectively, cut away portion 83 permitting movement of the aforementioned lever arm 107.

The mirror supports 39 and 40 are operatively connected by the lever arm 125, whereby the motion imparted to support 39 through the action of gyroscope 45, in a manner to be subsequently more fully explained, is also imparted to mirror support 40, whereby when these mirrors are rotated about their supporting shafts, longitudinal center lines of the faces are continuously maintained in parallel relationship. The arm 125 has flattened end portions 127 and 128 having longitudinally extending slots 131 and 132 therein respectively, Fig. 5. The mirror supports 39 and 40 have enlarged portions 177 and 178 for bores therein respectively at the inner ends thereof for receiving fixedly therein the pins 123 and 124 respectively, which move in slots 131 and 132 respectively, Fig. 5. The lever 125 is pivotally supported for movement in yoke 131 by screw 130, the yoke being formed integral with post support 132 which passes through opening 129 in the large mirror support 116 to the raised plate 136 in the housing 139, and may be formed integral therewith, Fig. 5.

Figure 5:
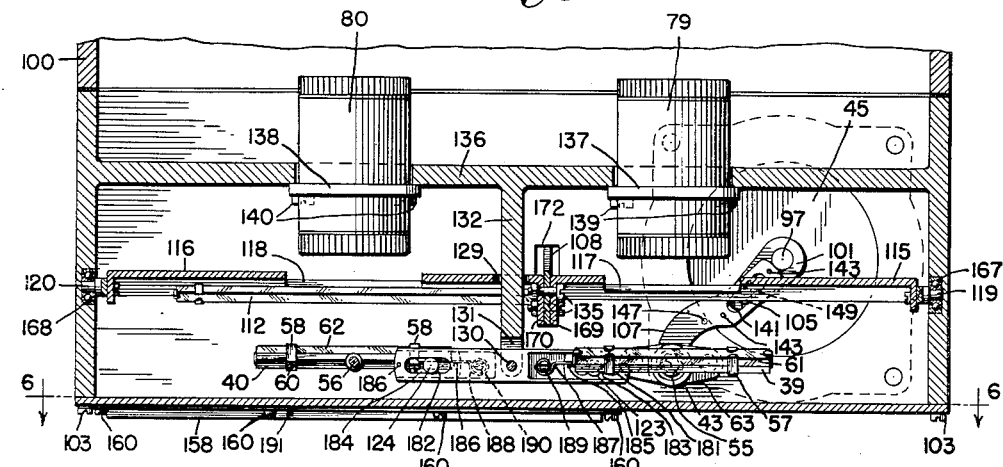
Fig. 5 is a vertical section in an irregular plane normal to the plane of Fig. 4.

Referring now particularly to Fig. 5, it is seen that the extended flat portions 127 and 128 of lever arm 125 have hard metal working surfaces 183 and 184 of steel or other suitable material fixed thereto by suitable means, such as rivets 185 and 186 respectively. Spring vibration suppressing means 187 and 188 respectively are provided for minimizing the effects of high frequency vibration of the aircraft, the springs normally bearing against the pins with a suitable small pressure, and may be fixed to the arms 127 and 128 by any suitable means, such as screws 189 and 190 respectively. The mirror supports 39 and 40, Fig. 3, are seen to have at the outer ends thereof counterweights 179 and 180 respectively to offset the weight of pins 123 and 124, whereby the mirror supports and mirrors may be statically balanced, counterweight 199 being also provided on mirror support 39 to offset the weight of lever 107.

Fig. 5 shows with particular clearness the operative connection between mirror shaft 55 and gyroscope 45. The shaft 97, Fig. 3, is the supporting shaft for the outer gimbal ring of gyroscope 45, and is adapted to turn as the gyroscope operates to maintain the gimbal ring in its original position as the aircraft undergoes angular movements, as will be readily understood by those skilled in the art. Fixed to the gimbal shaft by any suitable means and adapted to turn therewith is a crank arm 101, having fixed thereon the pin 105. The lever arm 107 fixed to mirror shaft 55 has disposed near the end thereof a slot 149 adapted to receive pin 105, whereby motion of the crank arm attached to the gimbal shaft is imparted to the lever and mirror, causing the mirror 61 to rotate about the axis of the shaft 55. The longitudinal axis of the slot should be substantially on the line between the axes of shafts 55 and 97. The lever arm 107 may be provided with a working surface held thereon by rivets 143, and spring vibration suppressing means 141 similar to the surface 184 and spring 188 previously described, the end of the screw holding the spring to the arm being seen at 147.

Figure 4:
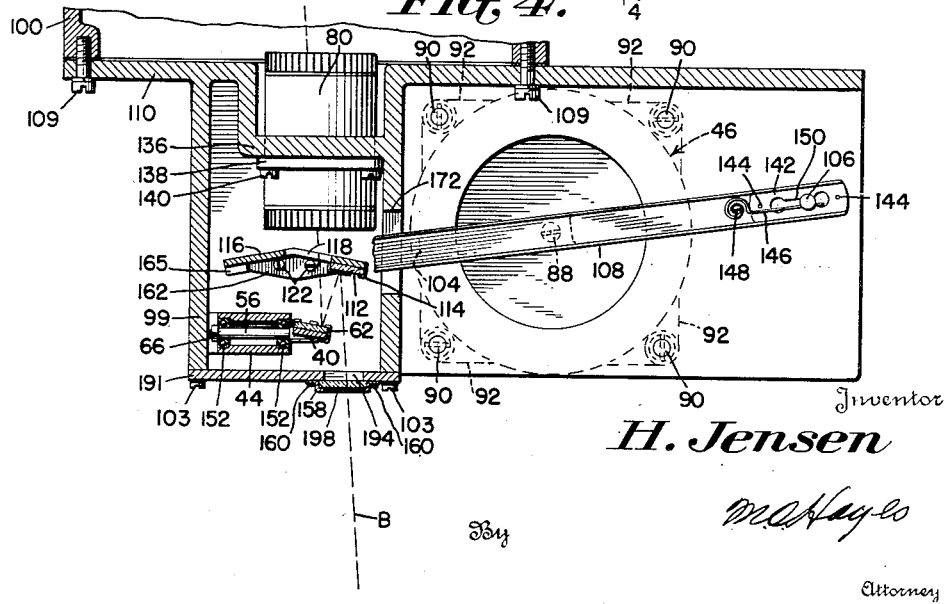
Fig. 4 is a vertical section along the line 4—4 of Fig. 3.

Fig. 3, taken in conjunction with Fig. 4, shows with particular clearness the operative connection between the mirror supports 115 and 116 having mirrors 111 and 112 respectively carried thereby, and the gyroscope 46. As previously explained, the mirror supports 115 and 116 are adjustably fixed to lever 108, whereby movement of the lever causes the mirror supports to rotate about the axes of supporting studs 119 and 120 respectively, thereby moving the mirrors. The lever arm 108 extends through the aforementioned opening 172 in the side wall of the housing 99, and has, near the outer end thereof, a longitudinally extending slot 150, Fig. 4, adapted to receive the pin 106 which is attached to crank arm 102 which is fixed by any convenient manner such as screw 88 to the extended gimbal shaft 98 of gyroscope 46, the gimbal shaft being adapted to rotate as the gyroscope operates to maintain the outer gimbal ring thereof in a fixed position as the aircraft moves angularly in a predetermined plane. The lever arm 108 is seen to have fixed thereto by rivets 144 a hard working surface 142, and to be provided with spring vibration suppressing means 146 fixed thereon by screw 148. The crank 102 attached to the gimbal shaft is seen to have an extended portion 104 which serves as a counterbalance. The mirror supports 115 and 116 are observed, Fig. 3, to have counterweights 165 and 166 attached near the outer ends thereof respectively, the whole moving system of mirrors 111 and 112, supports 115 and 116, lever 108, crank 102, and counterbalance 104 being statically balanced.

Figure 7:
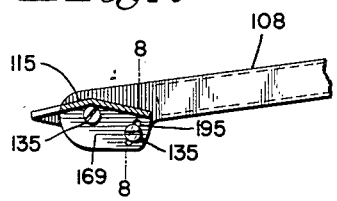
Fig. 7 is a detailed view of the connection between a mirror support and the shaft which operatively connects it to the gyroscope.
Figure 8:
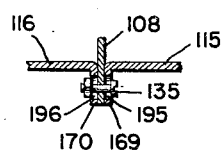
Fig. 8 is a section along the line 8—8 of Fig. 7.

Reference is made now to Figs. 7 and 8 which show details of the manner in which supports 115 and 116 are fixed to lever arm 108. The raised portions 169 and 170 of mirror supports 115 and 116 respectively have bores therein for receiving one of screws 135, and also have slots 195 and 196 respectively therein through which a screw 135 passes, the last named screw passing through a bore in lever arm 108, the slot permitting adjustment of the angle at which the lever arm connects with the mirror supports 115 and 116, thereby adjusting the angle which the mirrors 111 and 112 make with respect to their respective lenses and their associated mirrors.

Figure 6:
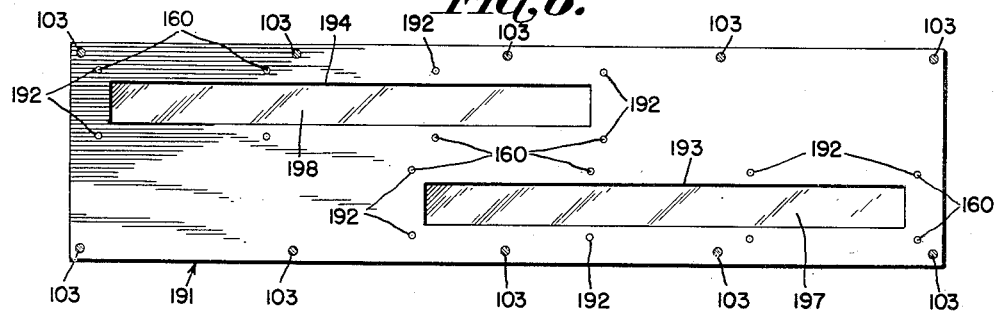
Fig. 6 is a view of the cover for the lens and mirror housing, taken along the line 6—6 of Fig. 5.

The lens housing 99 is seen, Fig. 3, to have a number of threaded bores therein suitable for receiving screws 103 thereby to attach a cover plate 191 seen in Fig. 6, which is a view taken along the line 6—6 of Fig. 5. The cover plate 191 has a pair of rectangular openings 193 and 194 therein, the openings being provided to permit passage of the light rays from the object to the mirrors and lenses, and are covered by transparent window panes 197 and 198 respectively, the panes being made of glass or other suitable material. Fig. 4 shows details of the manner in which panes 197 and 198 are fixed to plate 191. The pane 198 is observed to have a rectangular retaining clamp or frame 158 disposed therearound, the clamp having an extended flange portion with bores therein for receiving screws 160 which are threaded for engagement by holes 192 in the plate 191, pane 197 being similarly mounted, the panes being securely held to the plate 191 by the above described apparatus.

In Fig. 4, the line designated B shows the path of travel of light rays which originate at substantially the center of the field of view 50 of lens 42, Fig. 2. The light rays are seen to strike the mirror 112 at a small angle to the face thereof, the face of the mirror as mounted on support 116 being inclined at a small angle to the axis of lens 42. After reflection from mirror 112 the light rays strike mirror 62 which is also inclined at a similar small angle to the lens axis, and from thence they are reflected to the lens. A similar sequence is followed by light rays originating in the center of the field of view 49 of lens 41, Fig. 2, which travel in the line A and are sequentially reflected from mirrors 111 and 61, and thence to lens 41.

One of the purposes or objects of the present invention is to provide image stabilization, and this is accomplished by rotating the mirror faces to vary the angles of reflection therefrom to compensate for random angular movements of the camera with respect to the object, these movements in the application shown occurring as the aircraft pitches and rolls. Accordingly, as mirrors 111 and 112 are rotated, the angles of rotation occur in the same plane as that of angular movements of the aircraft as it pitches, and mirrors 61 and 62 are rotated in the same plane as that of the angular movements which occur when the aircraft rolls.

In accordance with the basic law of reflection from plane surfaces, that the angle of reflection is equal to the angle of incidence, to accomplish the desired image stabilization it is necessary to rotate the mirrors through one-half the angular movements of the aircraft.

It is noted that in the subject embodiment light rays from the object strike mirrors 111 and 112 first, are from thence reflected to mirrors 61 and 62 respectively, and from thence to lenses 41 and 42 respectively. It will be apparent to those skilled in the art to which the invention pertains that, because of the sequence of reflections, the compensating movements of mirrors 111 and 112 must be in the opposite angular direction from the movements of the aircraft as it pitches, and that the compensating movements of mirrors 61 and 62 must be in the same angular direction as the movements of the aircraft as it rolls. It will also be apparent that the optical sequence of these mirrors could be reversed, if desired, and an arrangement made in which light first reached the roll correction mirrors 61 and 62, in which case, proper operation of the system would require that the relative angular motions of the mirrors be reversed.

The gyroscopes 45 and 46, and the operative connections between these and their respective mirrors, comprising crank 101 and lever 107, and crank 102 and lever 108, respectively, accomplish the desired rotations of the mirrors in a manner to be subsequently apparent.

The gyroscopes 45 and 46 may be similar to gyroscopes 5 and 6, which, as previously explained, each has an outer gimbal ring having an extended shaft, the gimbal rings being adapted to be maintained by action of the gyroscope in a predetermined position as the aircraft or other moving body moves angularly with respect thereto in a plane normal to the axis of rotation of the gimbal shaft, the shaft rotating about its axis. Hence, it will be readily seen that the gyroscope, in resisting angular movement of the supporting body and in tending to maintain the gimbal ring in its original plane with respect to the earth, causes the crank arm attached to the gimbal shaft always to move angularly with respect to the aircraft in an opposite direction to that in which the aircraft moves angularly with respect to the earth.

Particular reference is made now to Figs. 3 and 4 which reveal most fully the operative connection between mirrors 111 and 112 and gyroscope 46. As previously explained, the gyroscope 46 has a gimbal shaft 98 having a crank 102 fixed thereto for rotation therewith, the crank having pin 106 fixed thereon, the pin engaging a slot 150 in lever arm 108 which is fixed to mirror supports 115 and 116, rotation of the crank arm resulting in rotation of the mirrors about shafts 119 and 120. It is observed that this particular arrangement of linkages provides that the mirrors are rotated in the same angular direction as the gimbal shaft and hence in the opposite angular direction from the motion of the aircraft as it pitches. If the distance between the axis of rotation of the gimbal shaft 98 and the center line of pin 106 is one-half the distance between the center line of pin 106 and the axis of rotation of mirror supports 115 and 116 about shafts 119 and 120, the supports and mirrors attached thereto will be rotated one-half the amount of rotation of crank 102 and hence one-half the angular movement of the aircraft. Whereas a small and increasing error in the ratios is introduced as the angle of rotation of crank 102 is increased, the linkage is sufficiently accurate within a useable range of several degrees, for example, five. Conditions resulting in random angular movements of the aircraft of greater magnitude would probably render photography undesirable for a variety of reasons.

Referring now particularly to Fig. 5 which shows details of the operative connection between mirrors 61 and 62 and gyroscope 45, it is seen that a crank 101 is fixed to gimbal shaft 97 to rotate therewith, the crank having a pin 105 fixed thereto, the pin engaging a slot in lever arm 107, whereby motion of the gimbal shaft and crank impart motion to the lever arm 107 and mirror shaft 55. It is observed that because of the particular linkage employed, mirror shaft 55 is rotated in the opposite direction to the movement of crank 101 and hence in the same direction as the aircraft moves angularly with respect to the object in a plane normal to the axis of shaft 97. If the distance between the axis of rotation of shaft 97 and the center line of pin 105 is one-half the distance between the center line of pin 105 and the axis of rotation of shaft 55, the shaft and mirror support 39 will be rotated one-half the angular rotation of crank 101, this ratio being accurate over small angles, as previously explained.

Reference is made now to Figs. 3 and 5 which show details of the linkage between mirror supports 39 and 40. The center line of pin 130 is substantially centrally disposed between pins 123 and 124 when the mirror supports are in their normal position and no corrective movement has taken place. It will be readily seen that movement of mirror support 39 in, for example, a clockwise direction, Fig. 5, about shaft 55 in response to action of gyroscope 45, results in the left-hand end of support 39, as seen in Fig. 5, being raised with respace to the right end. The right end of arm 125 will be accordingly raised, lowering the left end thereof, which, due to the operative connection afforded by the pin and slot, lowers the right end of mirror support 40. Hence, an arrangement is provided by which mirror supports 39 and 40 are substantially simultaneously rotated in equal amounts and directions about shafts 55 and 56 respectively due to the action of gyroscope 45.

In summary, assuming that the camera 100 is mounted in the aircraft 1 as shown in Fig. 2, and that the line of flight with respect to lenses 41 and 42 is from top to bottom as seen in Fig. 3, the operation of the devices to stabilize the image as the aircraft undergoes random angular movements with respect to the terrain is substantially as follows: When the aircraft rolls in a direction such, for example, that the side of the camera adjacent lens barrel 79, as seen in Fig. 5, is raised with respect to the side adjacent lens barrel 80, the crank 101 attached to the gimbal shaft of gyroscope 45 will rotate in a clockwise direction, the pin attached thereto causing lever 107 to rotate in a counter-clockwise direction, thereby rotating the mirrors 61 and 62 in a counter-clockwise direction or the same direction as the aircraft and camera move with respect to the object, the angle of rotation of the mirrors being one-half the angle of rotation of the camera. Such corrective movement provides that the lines of sight of the lenses, after reflection from the mirrors, are still substantially parallel to the original line of sight between the aircraft and terrain, in the plane of correction. When the aircraft returns to its normal position, action of the gyroscope restores mirrors 61 and 62 to their original positions. Had the angle of roll of the aircraft been in the opposite direction, the angle of rotation of mirrors 61 and 62 would also have been in the opposite direction, as provided for by the action of gyroscope 45.

Assume now by way of description that the aircraft undergoes a pitching movement whereby the left hand end of the camera as seen in Fig. 4 is raised with respect to the right hand end. The crank attached to the gimbal shaft of gyroscope 46 rotates in a counter-clockwise direction, thereby rotating arm 108 and mirrors 111 and 112 in a counter-clockwise direction, or opposite to the direction in which the aircraft and camera move with respect to the earth. It will be readily understood by those skilled in the art to which the invention pertains that such movement of the mirrors provide that the lines of sight of lenses 41 and 42, after reflection from their respective pairs of mirrors, are still directed in substantially their original lines toward the earth below, these lines being displaced somewhat from the vertical, as seen in Figs. 2 and 4. Had the aircraft moved angularly in the opposite direction, the mirrors 111 and 112 would have been rotated by action of gyroscope 46 in a direction opposite to their previously described movement, the mirrors being returned to their normal position when the aircraft returned to its original position.

Roll and pitch of the aircraft occuring concurrently are corrected for by concurrent operation of the two gyroscopes and their associated mirrors.

Figure 9:
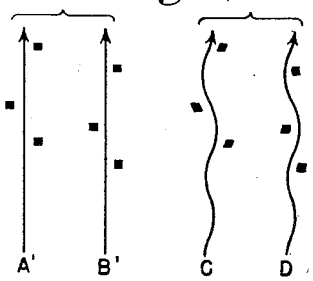
Fig. 9 is an outline view of a portion of the terrain, as it appears when photographed without image stabilizing apparatus, and when photographed with an image stabilized stereo-camera of the present invention.

Reference is made now to Fig. 9, which shows schematically the images recorded on the film of camera 100 mounted in an aircraft, lines A' and B' indicating the paths of travel along the terrain of lines of sight A and B of lenses 41 and 42 respectively, while the aircraft is rolling and pitching, it being understood that the paths A' and B' are displaced only by the distance between the lenses, but are somewhat displaced in time, the physical displacement of the paths of Fig. 9 being exaggerated for the purpose of clearness. As previously stated, lens 41 looks somewhat in advance of the plumb line whereas lens 42 looks somewhat to the rear, so that objects on the terrain, indicated by the small squares, appear somewhat advanced in time in line A' over the same objects in line B'.

Lines C and D indicate the results which would be obtained under the same conditions by a stereo-camera employing no, or inadequate, image stabilization. The crookedness of the lines indicates the results of deviation of the lines of sight of the lenses from their original positions, caused by pitch and roll of the aircraft, the recorded images being rotated and distorted.

Whereas the camera has been illustrated as having its field of view directed downwardly from the aircraft, it is of course understood that the field might be directed in any other chosen direction, suitable rearrangement of the gyroscopes, mirrors, and linkages being made.

Whereas the invention has been described with particular reference to its use on aircraft, it is of course understood that it may be used for obtaining undistorted photographs from any moving body subjected to random angular movements with respect to the object, such as a train, automobile, etc.

Whereas the preferred embodiments of the device have been shown as using gyroscopes as the stabilizing means, it is of course understood that other means may be used, for example vertical seeking pendulums, gravity devices, or inertial masses, suitably connected operatively to the reflecting surfaces for rotating them in heretofore described manners.

Whereas the reflecting elements have been shown as mirrors, it is of course understood that any other suitable optical device may be used.

Whereas the invention has been described herein with reference to two embodiments which give satisfactory results, it will be understood by those skilled in the art to which the invention pertains, after understanding the invention, that various modifications of form or structure may be made without departing from the spirit or scope of the invention, and it is therefore intended to include all such modifications and equivalents, both mechanical and optical, and that the invention be limited only by the appended claims.

This invention herein described and claimed may be manufactured and used by or for the Government of the United States of America for governmental purposes without the payment of any royalties thereon or therefor.

What is claimed as new and desired to be secured by Letters Patent of the United States is:

1. A stabilized optical system comprising a first lens and a second lens, a first pair of mirrors and a second pair of mirrors, said first pair of mirrors being mounted for rotation on axes individual thereto and arranged to reflect sequentially an image of an object into said first lens, said second pair of mirrors being mounted for rotation on axes individual thereto and arranged to reflect sequentially an image of the object into said second lens, a first gyroscope, means interconnecting said first gyroscope and one mirror of each pair of mirrors for causing rotation thereof to compensate for angular movements in one plane of both said lenses with respect to the object, a second gyroscope, and means interconnecting said second gyroscope and the other mirror of each of said pair of mirrors for causing rotation thereof to compensate for angular movement in another plane of both of said lenses with respect to said object, the compensating movements respectively controlled by the two gyroscopes taking place in two different planes of correction substantially normal to each other.

2. Photographic apparatus for use on aircraft comprising a stereo-camera having a pair of lenses and adapted to be fixed to said aircraft to partake of angular movements thereof, the lines of collimation of said lenses being substantially parallel, a first pair of mirrors and a second pair of mirrors, said first and second pair of mirrors being disposed adjacent individual lenses of said camera respectively, the reflecting surfaces of said pairs of mirrors being normally disposed so as to reflect images into the lenses of said camera, one of the mirrors of said first pair being connected with one of the mirrors of said second pair and both mirrors adapted to rotate about an axis transverse to the lines of sight of said lenses, the other mirror of said first pair being connected with the other mirror of said second pair and both adapted to rotate about individual axes transverse to the lines of sight and transverse to the first named axis of rotation, a first gyroscope, means operatively connecting said first gyroscope with one mirror of each of said first and second pairs of mirrors to cause rotation about said first named axis, a second gyroscope, and means operatively connecting said second gyroscope with the other mirror of each of said first and second pair of mirrors to cause rotation about said individual axes, the movements of said mirrors as controlled from said gyroscopes compensating for angular movements of said aircraft as the craft rolls and pitches.

3. Image stabilizing means for obtaining undistorted images in a stereo-camera having a first lens and a second lens and adapted for use on an angularly moving body, comprising, in combination, a first pair of reflecting surfaces and a second pair of reflecting surfaces, said first pair of reflecting surfaces being normally disposed with respect to the first lens to reflect sequentially the image of a desired object into the first lens of said camera, said second pair of reflecting surfaces being normally disposed with respect to the second lens to reflect sequentially the image of a desired object into the second lens of said camera, a first reference system arranged on said body for maintaining a fixed position as said body moves in a first predetermined plane of angular movement, a second reference system arranged on said body for maintaining a fixed position as said body moves in a second predetermined plane of angular movement, first and second moving systems operatively connected to said first and second reference systems respectively, said first moving system including one reflecting surface of each of said first pair and said second pair of reflecting surfaces, said second moving system including the other reflecting surface of each of said first pair and said second pair of reflecting surfaces, the movements of said reflecting surfaces providing image stabilization for the lenses of said camera.

4. Photographic means for obtaining undistorted photographs of an object from a body subjected to irregular angular movements with respect to the object and comprising a camera having a pair of lenses, a first pair of reflecting surfaces arranged adjacent one of said lenses to sequentially receive and reflect an image of the object into said one of said lenses, a second pair of reflecting surfaces arranged adjacent the other of said lenses to sequentially receive and reflect an image of the object into said other of said lenses, and means including a first gyroscope operatively connected to one of each of said pair of reflecting surfaces and a second gyroscope operatively connected to the other one of each of said pair of reflecting surfaces for automatically and selectively varying the angle of reflection of each of said reflecting surfaces in a predetermined manner according to the angular movements of said lenses with respect to said object.

5. Photographic apparatus comprising, in combination, a camera having a pair of lenses, and means to stabilize the fields of view of the lenses as the camera undergoes random angular movement with respect to an object which it is desired to photograph, said means comprising two pairs of image reflecting elements, the elements of each pair of reflecting elements being individual to each lens and cooperating sequentially to reflect an image of the desired object thereinto, a pair of stabilizing elements, operative connections between each of said stabilizing elements and one reflecting element of each of said pairs of reflecting elements, means supporting said one and said other reflecting element of each of said pairs of elements for angular movement in a pair of planes respectively, said operative connections being adapted to automatically control the angular positions of the reflecting elements in said pair of planes as the camera moves angularly with respect to the object in said pair of planes respectively, said planes being substantially normal to each other.

6. Photographic apparatus for use on a body subjected to random angular movements with respect to a desired object and comprising a camera adapted to be fixed to said body and having a pair of lenses, and means to annul the effect of such angular movement on the fields of view of the lenses, said means comprising two pairs of movable mirrors, the mirrors of each pair cooperating sequentially to reflect an image of said desired object into one of said lenses; a pair of stabilizing devices carried on said body and arranged to maintain a fixed position irrespective of angular movements of the body in a pair of planes respectively, said planes being substantially perpendicular to each other, and individual operative connections between one mirror of each of said pair of mirrors and said stabilizing devices respectively for selectively moving the mirrors angularly in said pair of planes respectively at one-half the angle of movement of said body and camera with respect to said object thereby to stabilize the field of view of the camera.

7. A stabilized optical system for use on an angularly moving body comprising, in combination, a pair of lenses, four optically reflecting surfaces normally disposed in cooperating pairs so as to sequentially reflect images of a desired object into said lenses, a first reference system disposed on said body and arranged to maintain a fixed position irrespective of the angular motion of said body in a first predetermined plane of angular movement, a second reference system disposed on said body and arranged to maintain a fixed position irrespective of the angular motion of said body in a second predetermined plane of angular movement, first and second moving systems arranged to be moved angularly by said first and second reference systems in said first and second planes respectively at one-half the angular movement of the body as it moves angularly in said first and second planes of angular movement respectively, said first moving system including one reflecting surface of each of said pairs of surfaces, said second moving system including the other reflecting surface of each of said pairs of surfaces, the relative movements of said reflecting surfaces providing image stabilization for said lenses.

8. Photographic apparatus for use on aircraft comprising a camera having a pair of lenses and adapted to be fixed to said aircraft to partake of angular movements thereof, an optical system comprising two pairs of mirrors, each pair including a first movable mirror and a second movable mirror cooperating sequentially to reflect a desired image into one of the lenses of said camera, reduction levers, and means including a first gyroscope and a second gyroscope respectively connected by said reduction levers to the first and second mirrors of both of said pairs of mirrors for moving the mirrors selectively at one-half the angular movement of said camera thereby to stabilize the field of view of said camera as the aircraft and camera undergo random angular movements with respect to the desired object.

9. An optical instrument for use on an angularly movable body, comprising a camera having a pair of lenses, a supporting framework adapted to be fixed to said camera, a pair of gyroscopes fixed to said frame, each of said gyroscopes having an element adapted to maintain a fixed position as the body moves with respect thereto in one of a pair of planes respectively, said planes of movement being substantially normal to each other, a pair of mirror supporting shafts supported in said framework and adapted to be rotated about their axes, the angles of rotation of both of said shafts occurring in the same one of said planes of movement, operative connections between one of said shafts and one of said gyroscopes whereby said shaft is rotated one-half the angular rotation of said body in one of said planes, a pair of mirrors individual to said shafts and adapted to rotate therewith, a link connection between said mirrors whereby rotation of one mirror causes substantially equal rotation of the other mirror in the same direction, said mirrors being adapted to reflect images into lenses individual thereto, supporting means mounted within said frame and adapted to rotate about an axis normal to the axes of rotation of said shafts and substantially normal to the lens axes, an operative connection between said supporting means and the other one of said gyroscopes whereby said supporting means is rotated one-half of the angular movement of said body in the other plane of movement, and a second pair of mirrors carried by said supporting means and adapted to receive light rays from the object and reflect said rays into individual ones of said first named pair of mirrors.

10. An optical instrument for use on an angularly movable body comprising a camera having a pair of lenses, the optical axes of said lenses being substantially parallel; a supporting frame adapted to be secured to said camera; a pair of gyroscopes fixed to said frame, each of said gyroscopes having a gimbal ring, each of said gimbal rings having an extended gimbal shaft and being adapted to maintain a predetermined position as the body moves with respect thereto in one of a pair of planes respectively; said planes being normal to the axes of rotation of said gimbal shafts respectively and substantially normal to each other; a first mirror supporting shaft and a second mirror supporting shaft mounted in said framework and adapted to be rotated about their axes, the angles of rotation of both of said first and second mirror shafts occurring in the same one of said planes of movement; a first crank arm having a pin fixed thereto and adapted to be rotated with one of said gimbal shafts; a lever arm attached to said first mirror supporting shaft and adapted to rotate therewith and having an extended slot therein for engagement with said pin, whereby motion of said gimbal shaft is imparted to said mirror supporting shaft, the distance between the center line of said pin and the axis of said gimbal shaft being substantially one-half the distance between the center line of said pin and the axis of said mirror supporting shaft; mirrors individual to said mirror supporting shafts and adapted to rotate therewith, said mirrors being adapted to reflect images into individual lenses respectively associated therewith; a link connection between said mirrors whereby rotation of one mirror causes substantially equal rotation of the other mirror in the same direction; mirror supporting means mounted within said frame and adapted to rotate about an axis normal to the axes of rotation of said first and second mirror supporting shafts and substantially normal to the lens axis; an operative connection between said mirror supporting means and the other one of said gyroscopes whereby said supporting means is rotated one-half the angular rotation of said body in the other plane of movement, said operative connection comprising a crank having a pin fixed thereto and fixed to the other of said gimbal shafts to rotate therewith, and a lever attached to said mirror supporting means and having a slot therein for receiving said pin, the distance between the center line of said last named pin and the axis of rotation of said last named gimbal shaft being one-half the distance between the center line of said last named pin and the axis of rotation of said mirror supporting means; and a pair of mirrors carried by said mirror supporting means in predetermined position thereon and adapted to receive light rays from the object and reflect said rays into individual ones of said first mentioned pair of mirrors respectively.

11. Image stabilizing apparatus for a stereocamera having a pair of lenses and mounted in an angularly moving body comprising, a first pair of mirrors and a second pair of mirrors, each of said pairs of mirrors having the reflecting surface of one mirror individual to one of the lenses and facing toward the lens individual thereto and the reflecting surface of the other mirror facing toward an object to be photographed, said mirrors facing the lens being arranged to receive an image of the object from the mirrors facing the object and to reflect said image into the lens individual thereto, means supporting said mirrors facing the object for rotation about axes perpendicular to the axes of the lenses individual thereto and in the plane of pitching movement of the body, means supporting said mirrors facing the lenses for rotation about axes perpendicular to said lens axes and to said first named mirror and in the plane of rolling movement of the body, a first gyroscope operatively connected to each of said mirrors facing the object and having its principal axis parallel to the axis of rotation of said mirrors facing the object, a second gyroscope operatively connected to each of said mirrors facing the lenses and having the principal axis thereof parallel to the axis of rotation of said mirrors facing the lenses, said operative connection for said mirrors facing the object being arranged to rotate the mirrors at one-half the angle and in the opposite direction of the angular movements of the moving body in said plane of pitching movement thereof, said operative connection for said mirrors facing the lenses being arranged to rotate the mirrors at one-half the angle and in the same direction of the angular movements of the moving body in said plane of rolling movement thereof.

HOMER JENSEN.

REFERENCES CITED

The following references are of record in the file of this patent:

UNITED STATES PATENTS

| Number | Name | Date |
|---|---|---|
| 1,651,025 | Henderson | Nov. 29, 1927 |
| 1,735,109 | Eliel | Nov. 12, 1929 |
| 2,147,615 | Baroni | Feb. 14, 1939 |

FOREIGN PATENTS

| Number | Country | Date |
|---|---|---|
| 749,767 | France | July 29, 1933 |